(12) United States Patent
Ma et al.

(10) Patent No.: US 11,297,522 B2
(45) Date of Patent: Apr. 5, 2022

(54) MEASUREMENT GAP INDICATION METHOD, MEASUREMENT GAP RECEIVING METHOD, USER EQUIPMENT AND NETWORK DEVICE

(71) Applicant: VIVO MOBILE COMMUNICATION CO., LTD., Guangdong (CN)

(72) Inventors: Yue Ma, Chang'an Dongguan (CN); Li Chen, Chang'an Dongguan (CN); Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 60 days.

(21) Appl. No.: 16/757,992

(22) PCT Filed: Oct. 17, 2018

(86) PCT No.: PCT/CN2018/110608
§ 371 (c)(1),
(2) Date: Apr. 21, 2020

(87) PCT Pub. No.: WO2019/091265
PCT Pub. Date: May 16, 2019

(65) Prior Publication Data
US 2020/0296612 A1    Sep. 17, 2020

(30) Foreign Application Priority Data
Nov. 10, 2017  (CN) .......................... 201711107853.5

(51) Int. Cl.
*H04W 4/00* (2018.01)
*H04W 24/10* (2009.01)
(Continued)

(52) U.S. Cl.
CPC ........... *H04W 24/10* (2013.01); *H04L 5/0048* (2013.01); *H04W 72/0453* (2013.01)

(58) Field of Classification Search
CPC .. H04W 24/10; H04W 72/0453; H04L 5/0048
(Continued)

(56) References Cited

U.S. PATENT DOCUMENTS

2011/0237202 A1* 9/2011 Uemura ................ H04W 24/08
455/67.14
2012/0113866 A1* 5/2012 Tenny ................... H04W 24/10
370/254
(Continued)

FOREIGN PATENT DOCUMENTS

CN   102595475 A   7/2012
CN   106535215 A   3/2017
(Continued)

OTHER PUBLICATIONS

Intel (R2-1701298, " Signaling support for NCSG and per CC measurement gap", Athens, Greece Feb. 13- 17, 2017). (Year: 2017).*
(Continued)

*Primary Examiner* — Maharishi V Khirodhar
(74) *Attorney, Agent, or Firm* — Maschoff Brennan

(57) ABSTRACT

A measurement gap indication method includes: obtaining indication information of whether a measurement gap is required when a user equipment operates with a target parameter; and transmitting the indication information to a network device. The target parameter includes at least one of carrier, carrier frequency band combination, bandwidth part, bandwidth part combination and reference signal.

20 Claims, 3 Drawing Sheets

(51) Int. Cl.
*H04L 5/00* (2006.01)
*H04W 72/04* (2009.01)

(58) Field of Classification Search
USPC .......................................................... 370/329
See application file for complete search history.

(56) References Cited

U.S. PATENT DOCUMENTS

| | | | |
|---|---|---|---|
| 2013/0242796 A1* | 9/2013 | Chen ....................... | H04L 5/001 370/252 |
| 2016/0037369 A1 | 2/2016 | Parkvall et al. | |
| 2016/0337893 A1* | 11/2016 | Gheorghiu ............ | H04W 24/10 |
| 2018/0006774 A1* | 1/2018 | Yiu ......................... | H04L 5/001 |
| 2019/0124651 A1 | 4/2019 | Xu et al. | |
| 2020/0275297 A1* | 8/2020 | Jung ..................... | H04W 24/10 |

FOREIGN PATENT DOCUMENTS

| | | |
|---|---|---|
| CN | 107295669 A | 10/2017 |
| WO | 2013/104129 A1 | 7/2013 |
| WO | 2017/020239 A1 | 2/2017 |

OTHER PUBLICATIONS

CN Office Action in Application No. 201711107853.5 dated Sep. 30, 2020.
Written Opinion and International Search Report in Application No. PCT/CN2018/110608 dated May 22, 2020.
EP Search Report in Application No. 18877224.8 dated Nov. 17, 2020.
"On intra-frequency measurements gaps" 3GPP TSG RAN WG1 Meeting #90bis, Oct. 9, 2017.
"Measurement gaps for intra-frequency RSTD measurements in feMTC" 3GPP TSG-RAN2 Meeting #89, May 15, 2017.

* cited by examiner

MEASUREMENT GAP INDICATION METHOD, MEASUREMENT GAP RECEIVING METHOD, USER EQUIPMENT AND NETWORK DEVICE

CROSS-REFERENCE TO RELATED APPLICATION

This application is the U.S. national phase of PCT Application PCT/CN2018/110608 filed on Oct. 17, 2018, which claims the benefit and priority of Chinese Application No. 201711107853.5, filed on Nov. 10, 2017, the disclosures of which are incorporated in their entirety by reference herein.

TECHNICAL FIELD

The present disclosure relates to the field of communication technologies, and in particular to a measurement gap indication method, a measurement gap receiving method, a user equipment and a network device.

BACKGROUND

Long Term Evolution (LTE) introduces measurement gap in inter-frequency/inter Radio Access Technology (inter-RAT) measurement. The so-called measurement gap mainly refers to interruption time caused by returning from one radio frequency (RF) to another RF for measuring corresponding reference signal in measurement process.

Patterns of the measurement gap in the LTE are fixed. A network device configures a start position of the measurement gap (including system frame number (SFN) and subframe information) through measurement gap configuration (measGapConfig) parameter, which is as shown in the following Table 1.

TABLE 1 gap pattern configuration table

| Gap Pattern ID | Measurement Gap Length (MGL, ms) | Measurement Gap Repetition Period (MGRP, ms) | Minimum available time for inter-frequency and inter-RAT measurement (Timer1, ms) | Measurement Purpose |
|---|---|---|---|---|
| 0 | 6 | 40 | 60 | E-UTRAN frequency division duplex and time division duplex, UTRAN frequency division duplex, GERAN, LCR time division duplex, HRPD, CDMA2000 1x |
| 1 | 6 | 80 | 30 | E-UTRAN frequency division duplex and time division duplex, UTRAN frequency division duplex, GERAN, LCR time division duplex, HRPD, CDMA2000 1x |

After a user equipment (UE) receives information of gap offset, the UE calculates a start position of the gap according to the following formula:

SFN mod $T$=FLOOR(gapOffset/10);

subframe=gapOffset mod 10;

with T=MGRP/10 as defined in TS 36.133 [16].

As can be seen from the above, the gap has a fixed time length of 6 ms, with only two alternative periods, and thus is no longer suitable for flexible reference signal configurations such as Channel State Information Reference Signal (CSI-RS) in the New Radio (NR) system.

Because capabilities of UEs are different, after one UE receives operation bandwidth (part) and measurement configuration, when the currently activated bandwidth (part) changes, the network device cannot predict how to accurately configure the measurement gap for the UE in each case, thereby affecting network communication.

SUMMARY

According to a first aspect, one embodiment of the present disclosure provides a measurement gap indication method including:

obtaining indication information of whether a measurement gap is required when a user equipment (UE) operates with a target parameter;

transmitting the indication information to a network device;

wherein the target parameter includes at least one of carrier, carrier frequency band combination, bandwidth part, bandwidth part combination and reference signal.

According to a second aspect, one embodiment of the present disclosure provides a measurement gap receiving method including:

receiving indication information of whether a measurement gap is required transmitted by a user equipment (UE);

wherein the indication information is determined when the UE operates with a target parameter; the target parameter includes at least one of carrier, carrier frequency band combination, bandwidth part, bandwidth part combination and reference signal.

According to a third aspect, one embodiment of the present disclosure provides a user equipment (UE) including:

an obtaining module used to obtain indication information of whether a measurement gap is required when the UE operates with a target parameter;

a first transmission module used to transmit the indication information to a network device;

wherein the target parameter includes at least one of carrier, carrier frequency band combination, bandwidth part, bandwidth part combination and reference signal.

According to a fourth aspect, one embodiment of the present disclosure provides a user equipment (UE) including: a memory, a processor, and a program stored on the memory and executable on the processor; wherein the program is executed by the processor to implement steps of the measurement gap indication method.

According to a fifth aspect, one embodiment of the present disclosure provides a computer-readable storage medium including a program stored thereon; wherein the program is executed by a processor to implement steps of the measurement gap indication method.

According to a sixth aspect, one embodiment of the present disclosure provides a network device including:

a sixth receiving module used to receive indication information of whether a measurement gap is required transmitted by a user equipment (UE);

wherein the indication information is determined when the UE operates with a target parameter; the target parameter includes at least one of carrier, carrier frequency band combination, bandwidth part, bandwidth part combination and reference signal.

According to a seventh aspect, one embodiment of the present disclosure provides a network device including: a memory, a processor, and a program stored on the memory and executable on the processor; wherein the program is executed by the processor to implement steps of the measurement gap receiving method.

According to an eighth aspect, one embodiment of the present disclosure provides a computer-readable storage medium including a program stored thereon; wherein the program is executed by a processor to implement steps of the measurement gap receiving method.

DETAILED DESCRIPTION

Figure 1:
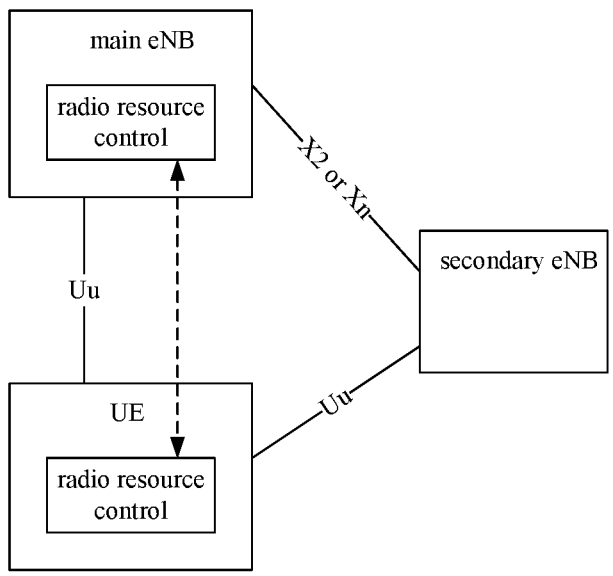
FIG. 1 shows a schematic diagram of a network connection architecture applicable to embodiments of the present disclosure.

The technical solution of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Terms such as "first" and "second" in the specification and claims of the present application are used merely to distinguish similar objects and are not necessarily used to describe a particular order or sequence. It is to be understood that data so used may be interchanged where appropriate, such that the embodiments of the present application described herein may be implemented, for example, in a sequence other than those illustrated or described herein. Furthermore, the terms "comprise", "include" or any other variations are intended to encompass a non-exclusive inclusion, such that a process, method, system, commodity, or device that include a series of steps or elements include not only those steps or elements but also other steps or elements that are not explicitly listed, or steps or elements that are inherent to such process, method, commodity, or device. In addition, "and/or" in the specification and claims of the present application means at least one of connected objects, for example, A and/or B means that there are three cases of including A alone, including B alone, and including both of A and B.

In the embodiments of the present disclosure, words such as "exemplary" or "for example" are used as examples, instances or illustrations. Any embodiment or design described as "exemplary" or "for example" in the embodiments of the present disclosure should not be construed as more preferred or advantageous over other embodiments or designs. Rather, the words "exemplary" or "for example" is intended to present relevant concept in a concrete manner.

The embodiments of the present disclosure are described hereinafter with reference to the drawings. The measurement gap indication method, the measurement gap receiving method, the user equipment and the network device provided in the embodiments of the present disclosure may be applied to a wireless communication system. The wireless communication system may be a system adopting a 5th Generation (5G) mobile communication technology (hereinafter referred to as a 5G system). Those skilled in the art can understand that the 5G NR system is merely an example and not a limitation.

In describing the embodiments of the present disclosure, some concepts used in the following description are explained first.

Numerology refers to subcarrier bandwidth, cyclic prefix (CP) length parameter, and transmission time interval (TTI) length used in communication frame structure. Different subcarrier bandwidths correspond to different time-domain symbol lengths, and then different frames have different lengths depending on configurations. It has been agreed in the NR that a reference signal to be measured is different from a serving reference signal in the Numerologies, and then the measurement gap may be required in this case.

Bandwidth Part (BWP) is a newly introduced concept in the 5G NR. From the perspective of physical layer, BWP means that for a large-bandwidth carrier, the large-bandwidth carrier may be divided into several parts and each part is a part with smaller bandwidth. For a connected UE, one or more BWPs may be configured for transmission of data and control. However, each activation can only activate one of them, because this is an operation performed on the large-bandwidth carrier, which is different from traditional carrier aggregation.

In the LTE, inter-frequency measurement and inter radio access technology (inter-RAT) measurement generally require gaps. Depending on actual different capabilities of the UEs, one UE may not require a measurement gap in some inter-frequency measurements, and thus needs to indicate "needforgap" to the network. In the NR, intra-frequency measurement and inter-frequency measurement are defined respectively for Synchronous Signal Block (SSB) and CSI-RS: when center frequencies of SSB/CSI-RS are different, or the Numerology of SSB/CSI-RS is different from the Numerology of SSB/CSI-RS of a neighboring cell to be measured at the same frequency, it is considered to be an inter-frequency measurement.

In the LTE, for all carriers or carrier combinations supported by the UE, for whether the measurement gap is required for each supported band relative to other supported bands, an indication of need for gap is given for inter-RAT measurement and inter-frequency measurement.

In LTE R14, a gap indication per-CC is introduced. That is, per-CC-Gap-Indication-List indication is carried in a radio resource control (RRC) reconfiguration complete message, and is used to indicate whether the UE requires a gap indication per-CC according to its capabilities after the UE receives measurement configuration.

The network device needs to configure the UE with corresponding measuring object (MO), report configuration, and measurement ID. The MO may be understood as measurement content of a frequency. In the NR, the MO may include measurement information of SSB and CSI-RS, and there may be an offset between the center frequency of the SSB or the CSI-RS and the center frequency of the MO.

Reference signals exist widely in wireless communication systems, and are mainly used to perform channel estimation and channel quality measurement feedback. CSI-RS is an existing concept in the LTE. The concept of beam is introduced in the NR, and CSI-RS can be flexibly configured for indicating beams and measurements. According to the current conclusion of the NR, in order to perform layer-3 measurement, the network device needs to inform the UE of time configuration information of the CSI-RS, including time offset value and period, as well as time-frequency resource mapping position, configurable transmission/measurement bandwidth and other information.

In the discussion of 5G NR interworking with LTE non-standalone scenarios, the first stage is mainly to take LTE base station as a main eNB (MeNB) and take NR gNB as a Secondary eNB (SeNB). However, the scenario in which the NR base station is taken as a MeNB and the LTE base station is taken as a SeNB, may continue to be discussed in the future, as shown in FIG. 1. It should be noted that NR-NR dual connectivity (DC) is similar to this, and will not be repeated here. In addition, carrier aggregation (CA) technology can aggregate multiple component carriers (CC) together to achieve a large transmission bandwidth and effectively increase uplink and downlink transmission rates. The UE decides the maximum number of carriers that can be simultaneously used for uplink and downlink transmission according to its own capacity. The CA function can support continuous or discontinuous carrier aggregation. The CA technology can be used in the LTE or the NR or other systems.

Because capabilities of UEs are different, after one UE receives operation bandwidth (or bandwidth part) and measurement configuration, when the currently activated bandwidth (or bandwidth part) changes, the network device cannot predict how to accurately configure the measurement gap for the UE in each case. In view of this, embodiments of the present disclosure provide a measurement gap indication method, a measurement gap receiving method, a user equipment and a network device.

Figure 2:
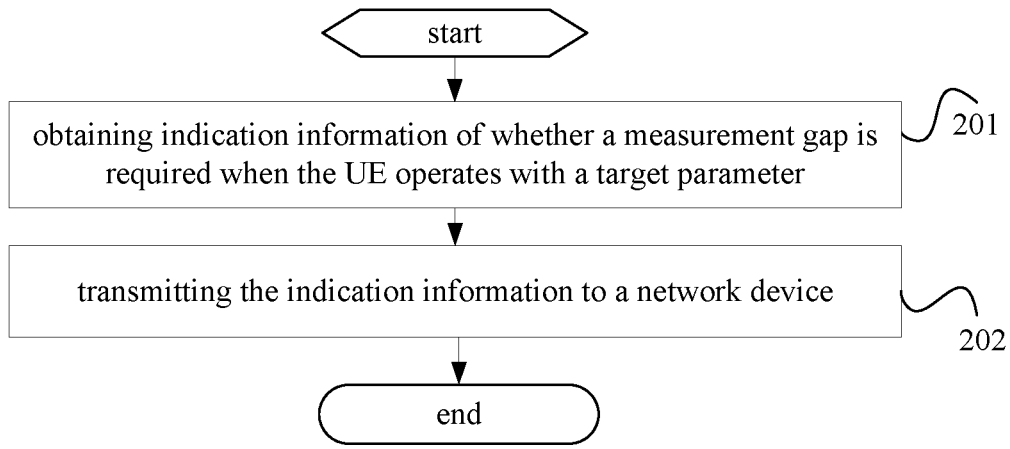
FIG. 2 is a schematic flowchart of a measurement gap indication method according to an embodiment of the present disclosure.

As shown in FIG. 2, one embodiment of the present disclosure provides a measurement gap indication method, which is applied to a user equipment (UE), including steps 201 to 202.

Step 201: obtaining indication information of whether a measurement gap is required when the UE operates with a target parameter.

It should be noted that the target parameter includes at least one of a carrier, a carrier frequency band combination, a bandwidth part, a bandwidth part combination and a reference signal.

Step 202: transmitting the indication information to a network device.

In this step, the indication information of whether the measurement gap is required is transmitted to the network device, so that the network device configures the measurement gap according to the indication information, thereby improving accuracy and effectiveness of the measurement gap configured by the network device.

Optionally, when the target parameter includes a carrier, the carrier includes: a center frequency and a bandwidth.

When the target parameter includes a bandwidth part, the bandwidth part includes at least one of identification information of the bandwidth part, a center frequency, an offset value according to a preset reference frequency, an occupied bandwidth and a subcarrier spacing.

For example, the bandwidth part may only include identification information of the bandwidth part (i.e., ID of the bandwidth part). The bandwidth part may also only include: a center frequency and an occupied bandwidth. The bandwidth part may also only include: an offset value according to a preset reference frequency and an occupied bandwidth.

The measurement gap indication method in this embodiment will be specifically described hereinafter with four cases including static reporting, semi-static reporting, dynamic reporting and full network configuration.

First. Static Reporting

In this reporting method, the target parameter which the UE is based on, includes at least one of a carrier, a carrier frequency band combination, a bandwidth part and a bandwidth part combination.

At this point, the step 101 may be implemented according to at least one of the following manners A1 to A6.

A1. According to supported carrier frequency band, obtaining indication information of whether a measurement gap is required when operating at a target carrier and performing a target measurement.

It should be noted that the target carrier refers to a certain carrier at which the UE operates.

A2. According to supported carrier frequency band combination, obtaining indication information of whether a measurement gap is required when operating at a target carrier combination and performing a target measurement.

It should be noted that the target carrier combination refers to a certain combination of carriers that the UE operates at, for example, the UE operates at carrier A and carrier B.

A3. According to supported bandwidth part (which, here, generally refers to all supported bandwidth parts), obtaining indication information of whether a measurement gap is required when operating at a target bandwidth part and performing a target measurement of first measurement item configured for other bandwidth part.

It should be noted that the target bandwidth part refers to a certain bandwidth part at which the UE operates.

A4. According to supported bandwidth part, obtaining indication information of whether a measurement gap is required when operating at a target bandwidth part and performing a target measurement of second measurement item configured for other bandwidth part.

A5. According to supported bandwidth part combination (which, here, generally refers to all supported bandwidth part combinations), obtaining indication information of whether a measurement gap is required when operating at a target bandwidth part combination and performing a target measurement of first measurement item configured for other bandwidth part combination.

A6. According to supported bandwidth part combination, obtaining indication information of whether a measurement gap is required when operating at a target bandwidth part combination and performing a target measurement of second measurement item configured for other bandwidth part combination.

It should be noted that in the case of static reporting, in several implementation manners, the target measurement mentioned includes at least one of: intra-frequency measurement, inter-frequency measurement, inter-system measurement, switched beam measurement and layer-1 measurement. The first measurement item includes: a carrier, a bandwidth part or a reference signal. The second measurement item includes at least one of a carrier, a carrier frequency band combination, a bandwidth part, a bandwidth part combination and a reference signal.

It should be noted that the above-mentioned intra-frequency measurement, inter-frequency measurement and inter-system measurement all belong to Layer-3 (L3) measurement. Measurement quantities of L3 are usually configured through radio resource control. The layer-1 measurement includes measurement performed by the UE operating at one bandwidth part or carrier when requiring reporting measurement result such as Channel Quality Indicator (CQI) of other bandwidth part, carrier or reference signal. As there is no possibility of inter-frequency measurement of CQI in the LTE, but the bandwidth part is introduced in the NR and then it may be necessary to perform inter-frequency measurement of CQI of inactive bandwidth part. It should be noted that the measurement quantities of the layer-1 may not be configured through radio resource control, so the UE may trigger reporting of measurement gap after receiving (all) measurement configuration from the network device.

It should also be noted that the measurement quantity of the target measurement described in this embodiment may be all measurement quantities of L1, L2 and L3.

In this case, the UE usually reports the indication information in a UE capability report. According to the UE capability report carrying the indication information, the network device configures corresponding measurement gap configuration information according to the indication information when performing corresponding activation BWP configuration and measurement configuration for the UE. Then, the network device transmits the measurement gap configuration information to the UE. According to the measurement gap configuration information, the UE performs corresponding measurement. It should be noted that the measurement gap configuration information configured by the network device includes at least one of a time start position, duration, a period, an aperiodic indication, a one-time indication and an offset.

It should also be noted that when the indication information of the UE indicates that the measurement gap is required, the indication information may further include: type information of the measurement gap that the UE expects to be configured by the network device. In other words, the UE informs the network device of the type of measurement gap that the UE most expects to be configured by the network device, so that the network device preferentially configures this type of measurement gap when the network device configures the measurement gap.

In this manner, the UE informs the network device of measurement gaps that need to be configured according to its own operation requirements, so that the network device completes configuration of the measurement gaps at one time, and informs the UE. Therefore, when the UE needs to use the measurement gaps, the UE does not always need to request for a measurement gap, which can reduce communication resource consumption in the subsequent communication procedure.

Second. Semi-Static Reporting

In this reporting manner, the specific implementation of the step 101 includes:

obtaining measurement-related information and configuration information of a target parameter configured by the network device for the UE; and according to the measurement-related information and the configuration information, obtaining indication information of whether a measurement gap is required when the UE operates with the target parameter.

It should be noted that the measurement-related information includes: measuring object (MO), reference signal configuration corresponding to the measuring object and configuration of measurement time window. The measuring object is a measuring object of at least one of intra-frequency measurement, inter-frequency measurement, inter-system measurement, switched beam measurement and layer-1 measurement.

The configuration information includes: at least one of time-frequency position, period, duration, offset, bandwidth, and Numerology of an item to be measured transmitted at UE servicing frequency and other frequency (it should be noted that the other frequency refers to one or more frequencies other than the servicing frequency; for example, the other frequency are all other frequencies other than the servicing frequency). The item to be measured includes at least one of Synchronous Signal Block (SSB) and CSI-RS.

Further, according to the measurement-related information and the configuration information, obtaining indication information of whether a measurement gap is required when the UE operates with the target parameter, specifically includes:

according to the measurement-related information and the configuration information, determining whether a measurement gap is required when operating with the target parameter and performing a target measurement, thereby obtaining indication information of whether a measurement gap is required corresponding to multiple target parameters (the multiple target parameters here refer to all target parameters configured for the UE).

It should be noted that, in the above reporting manner, the target measurement includes at least one of: intra-frequency measurement, inter-frequency measurement, inter-system measurement, switched beam measurement and layer-1 measurement.

It should also be noted that if the UE cannot obtain from itself and the network configuration whether a measurement gap is required when operating with a certain target parameter and performing a target measurement, then the UE considers by default that a measurement gap is required when the UE operates with the certain target parameter.

When the network device configures the measurement gap, one of the following situations may be adopted:

B1. According to the received indication information, determining, by the network device, how to configure the measurement gap when operating at a certain target parameter, and configuring all possible measurement gaps (including measurement gap required when operating at each possible target parameter) at one time for the UE.

B2. According to the received indication information, determining, by the network device, how to configure the measurement gap when operating at a certain target parameter; and transmitting a corresponding measurement gap configuration to the UE each time a certain target parameter is activated.

At this point, the UE only needs to receive the measurement gap configuration information, that is, receiving measurement gap configuration information required when the UE operates with multiple target parameters transmitted by the network device; or, receiving measurement gap configuration information required when the UE operates with an activated target parameter transmitted by the network device.

It should also be noted that, in the subsequent communication procedure, if the UE determines that a measurement gap is not needed for the target parameter, the UE transmits indication information of measurement gap not required to the network device, so that the network device stops configuring measurement gap for the target parameter.

For example, in the subsequent communication procedure, the UE finds that the measurement gap is not required in some case (such as operating at certain bandwidth part), and then indicates to the network device that measurement gap is not required in this case.

It should be noted that the measurement gap configuration information configured by the network device includes at least one of a time start position, duration, a period, an aperiodic indication, a one-time indication and an offset.

It should also be noted that when the indication information of the UE indicates that the measurement gap is required, the indication information may further include: type information of the measurement gap that the UE expects to be configured by the network device. In other words, the UE informs the network device of the type of measurement gap that the UE most expects to be configured by the network device, so that the network device preferentially configures this type of measurement gap when the network device configures the measurement gap.

This reporting manner reports the indication information according to the configuration information of the UE, which can enable the configuration information fed back by the network device more suitable for usage requirements of the network.

Third. Dynamic Reporting

In this reporting manner, the specific implementation of the step 101 includes:

obtaining measurement-related information and configuration information of a target parameter configured by the network device for the UE; and according to the measurement-related information and the configuration information, obtaining indication information of whether a measurement gap is required when the UE operates with the target parameter.

It should be noted that the measurement-related information includes: measuring object (MO), reference signal configuration corresponding to the measuring object and configuration of measurement time window. The measuring object is a measuring object of at least one of intra-frequency measurement, inter-frequency measurement, inter-system measurement, switched beam measurement and layer-1 measurement.

The configuration information includes: at least one of time-frequency position, period, duration, offset, bandwidth, and Numerology of an item to be measured transmitted by the network device within the bandwidth of a servicing frequency and other frequency. The item to be measured includes at least one of Synchronous Signal Block (SSB) and CSI-RS.

Further, according to the measurement-related information and the configuration information, obtaining indication information of whether a measurement gap is required when the UE operates with the target parameter, specifically includes:

according to the measurement-related information and the configuration information, determining indication information of whether a measurement gap is required when operating with an activated target parameter and performing a target measurement.

It should be noted that, in the above reporting manner, the target measurement includes at least one of: intra-frequency measurement, inter-frequency measurement, inter-system measurement, switched beam measurement and layer-1 measurement.

It should also be noted that if the UE cannot obtain from itself and the network configuration whether a measurement gap is required when operating with a certain target parameter and performing a target measurement, then the UE considers by default that a measurement gap is required for the certain target parameter.

When the network device configures the measurement gap, according to the received indication information, the network device only needs to obtain the measurement gap configuration information required when operating with the activated target parameter and configure the measurement gap configuration information for the UE. The UE only needs to receive the measurement gap configuration information required when the UE operates with the activated target parameter transmitted from the network device, and then performs measurement.

It should also be noted that, when the network device switches the bandwidth part, the indication information of whether a measurement gap is required when operating with the activated target parameter, is re-determined and reported to the network device.

For example, if the network side initiates a switching of activation operation of configured bandwidth parts, that is, the current bandwidth part is deactivated, the other bandwidth part enters an activated state, and the UE operates at the newly activated bandwidth part. Combining all measurement configuration information, the UE determines whether the measurement interval is required when operating at the currently activated bandwidth part and performing measurement such as intra-frequency measurement, inter-frequency measurement, inter-system measurement and switched beam measurement. Then, the UE informs the network of the corresponding indication information of whether the measurement gap is required. The network re-determines the measurement gap configuration information according to the indication information.

It should be noted that the measurement gap configuration information configured by the network device includes at least one of a time start position, duration, a period, an aperiodic indication, a one-time indication and an offset.

It should also be noted that when the indication information of the UE indicates that the measurement gap is required, the indication information may further include: type information of the measurement gap that the UE expects to be configured by the network device. In other words, the UE informs the network device of the type of measurement gap that the UE most expects to be configured by the network device, so that the network device preferentially configures this type of measurement gap when the network device configures the measurement gap.

In this reporting manner, the UE reports the indication information according to the real-time status of the network and the configuration information of the network, which can enable the configuration information fed back by the network device more suitable for usage requirements of the network.

Fourth. Full Network Configuration

In this manner, before the step 101, the UE first receives measurement gap configuration information configured for the UE transmitted by the network device. Then, when the UE implements the step 101, according to the measurement gap configuration information, the UE obtains indication information of measurement gap not required when the UE operates with the target parameter.

The measurement gap configuration information includes measurement gap configuration information for all measurements or measurement gap configuration information for some measurements.

In this case, after the network device configures all operating frequencies/operating BWPs and measuring objects for the UE, the network device directly configures measurement gap for the UE according to the configuration, i.e., configuring that all measurements require measurement gaps or presetting by default that all measurements require measurement gaps. After the UE receives all measurement gap configuration information, when the UE feeds back to the network device resources to be measured at certain target parameters according to the measurement configuration, for situation of measurement gap not required, the UE may report a situation of measurement gap not required among all configured resources in a unified manner, or report a situation of measurement gap not required every time some resource is activated.

It should be noted that the measurement gap configuration information configured by the network device includes at least one of a time start position, duration, a period, an aperiodic indication, a one-time indication and an offset.

It should also be noted that when the indication information of the UE indicates that the measurement gap is required, the indication information may further include: type information of the measurement gap that the UE expects to be configured by the network device. In other words, the UE informs the network device of the type of measurement gap that the UE most expects to be configured by the network device, so that the network device preferentially configures this type of measurement gap when the network device configures the measurement gap.

This manner is a one-time configuration procedure performed by the network device, and the UE feedbacks the part that does not need to be configured according to its own network status and the UE does not need to initial a request, which facilitates the UE to obtain measurement configuration information.

It should also be noted that, in this embodiment, the network device may configure different measurement gap configuration information for different measurement gaps.

The following are examples of conditions under which the UE requires measurement gaps and conditions under which the UE does not require measurement gaps.

The conditions under which the UE does not require measurement gaps are as follows:

C1. Synchronous signal blocks are at a frequency center, and frequency domain positions of synchronous signal blocks of a local cell and a neighboring cell are the same, an operating frequency band covers all reference signals to be measured;

C2. Synchronous signal blocks are offset from the frequency center, and frequency domain positions of synchronous signal blocks of a local cell and a neighboring cell are the same, an operating frequency band covers all reference signals to be measured;

C3. Multiple synchronous signal blocks are in an operating bandwidth and configured with multiple measuring objects; and frequency domain positions of synchronous signal blocks of a local cell and a neighboring cell are the same, an operating frequency band covers all reference signals to be measured;

C4. center frequencies of multiple carrier cells are inconsistent, and center frequencies of reference signal and a configured measuring object are offset, but finally all reference signals to be measured are in the same position.

It should be noted that, in the condition C4, the following relationships may exist between carriers: carriers partially overlap each other or there is an inclusion relationship between the carriers.

The conditions under which the UE requires measurement gaps are as follows:

D1. The operating frequency band of the UE does not include position of reference signal to be measured;

D2. The UE needs to measure other SSB reference signals on a carrier where it is located, which exceeds its operating frequency band;

D3. In the operating frequency band where the UE is located, in addition to SSB of a serving cell, SSB of a neighboring cell still needs to be measured, but subcarrier space (SCS) of the SSB of the neighboring cell is different from that of the serving cell;

D4. Data of a local cell and SSB of the neighboring cell coincide in time and frequency, but SCS of the data and the SSB are inconsistent; when the SSB at this frequency needs to be measured, the measurement gap is also required;

D5. When at the same frequency but belonging to different beams, the measurement gap may be required according to the UE capability.

In the embodiment of the present disclosure, the indication information of whether a measurement gap is required when the UE operates with the target parameter is reported to the network device, so that the network device configures the measurement gap according to the indication information, thereby ensuring that the network device can configure the measurement gap according to the usage requirements of the UE, and then improving effectiveness of configuration of the measurement gap.

Figure 3:
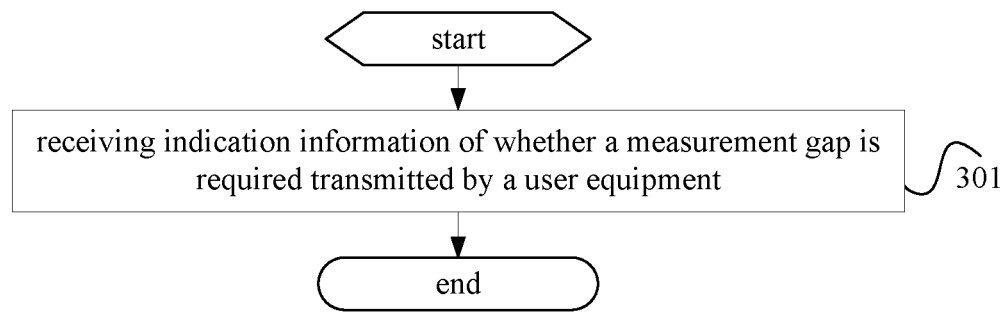
FIG. 3 is a schematic flowchart of a measurement gap receiving method according to an embodiment of the present disclosure.

As shown in FIG. 3, one embodiment of the present disclosure provides a measurement gap receiving method including step 301.

Step 301: receiving indication information of whether a measurement gap is required transmitted by a user equipment (UE).

The indication information is determined when the UE operates with a target parameter. The target parameter includes at least one of a carrier, a carrier frequency band combination, a bandwidth part, a bandwidth part combination and a reference signal.

Optionally, when the target parameter includes a carrier, the carrier includes: a center frequency and a bandwidth.

When the target parameter includes a bandwidth part, the bandwidth part includes at least one of identification information of the bandwidth part, a center frequency, an offset value according to a preset reference frequency, an occupied bandwidth and a subcarrier spacing.

Further, the step of receiving indication information of whether a measurement gap is required transmitted by a user equipment (UE), includes:

transmitting measurement-related information and configuration information of the target parameter to the UE;

receiving indication information of whether a measurement gap is required when the UE operates with the target parameter, which is determined by the UE according to the measurement-related information and the configuration information and transmitted by the UE.

Optionally, the measurement-related information includes: measuring object (MO), reference signal configuration corresponding to the measuring object and configuration of measurement time window.

The measuring object is a measuring object of at least one of intra-frequency measurement, inter-frequency measurement, inter-system measurement, switched beam measurement and layer-1 measurement.

Optionally, the configuration information includes: at least one of time-frequency position, period, duration, offset, bandwidth, and Numerology of an item to be measured transmitted at UE servicing frequency and other frequency.

The item to be measured includes at least one of Synchronous Signal Block (SSB) and CSI-RS.

Further, when the indication information is indication information of whether a measurement gap is required corresponding to multiple target parameters, the receiving method further includes:

transmitting measurement gap configuration information required when the UE operates with multiple target parameters to the UE; or, transmitting measurement gap configuration information required when the UE operates with an activated target parameter to the UE.

Further, before the step of receiving indication information of whether a measurement gap is required transmitted by a user equipment (UE), the method further includes:

transmitting measurement gap configuration information configured for the UE to the UE, where the measurement gap configuration information includes measurement gap configuration information for all measurements or measurement gap configuration information for some measurements.

The step of receiving indication information of whether a measurement gap is required transmitted by a user equipment (UE), includes:

receiving indication information of measurement gap not required transmitted by the UE.

Further, after the step of receiving indication information of whether a measurement gap is required transmitted by a user equipment (UE), the method further includes:

feeding back the measurement gap configuration information to the UE according to the indication information.

Optionally, the measurement gap configuration information includes at least one of a time start position, duration, a period, an aperiodic indication, a one-time indication and an offset.

Optionally, when the indication information indicates that the measurement gap is required, the indication information may include: type information of the measurement gap that the UE expects to be configured by the network device.

It should be noted that all the descriptions of the network device in the above embodiments are applicable to the embodiment of the measurement gap receiving method for the network device, and the same technical effects can also be achieved.

Figure 4:
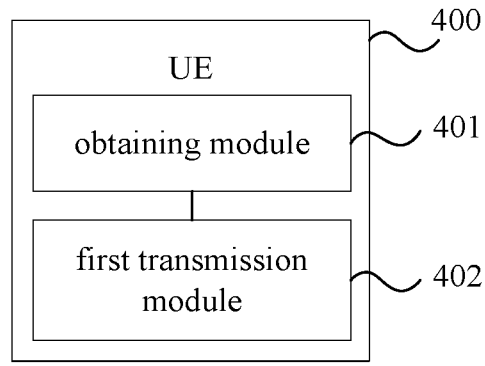
FIG. 4 is a schematic block diagram of a user equipment according to an embodiment of the present disclosure.

As shown in FIG. 4, one embodiment of the present disclosure further provides a user equipment (UE) 400, including:

an obtaining module 401 used to obtain indication information of whether a measurement gap is required when the UE operates with a target parameter;

a first transmission module 402 used to transmit the indication information to a network device.

The target parameter includes at least one of a carrier, a carrier frequency band combination, a bandwidth part, a bandwidth part combination and a reference signal.

Optionally, when the target parameter includes a carrier, the carrier includes: a center frequency and a bandwidth.

When the target parameter includes a bandwidth part, the bandwidth part includes at least one of identification information of the bandwidth part, a center frequency, an offset value according to a preset reference frequency, an occupied bandwidth and a subcarrier spacing.

Further, the obtaining module 401 includes:

a first acquiring unit used to obtain measurement-related information and configuration information of a target parameter configured by the network device for the UE;

a second obtaining unit used to, according to the measurement-related information and the configuration information, obtain indication information of whether a measurement gap is required when the UE operates with the target parameter.

The measurement-related information includes: measuring object (MO), reference signal configuration corresponding to the measuring object and configuration of measurement time window.

The measuring object is a measuring object of at least one of intra-frequency measurement, inter-frequency measurement, inter-system measurement, switched beam measurement and layer-1 measurement.

Optionally, the configuration information includes: at least one of time-frequency position, period, duration, offset, bandwidth, and Numerology of an item to be measured transmitted by the network device within the bandwidth of a servicing frequency and other frequency.

The item to be measured includes at least one of Synchronous Signal Block (SSB) and CSI-RS.

Further, the second obtaining unit is used to:

according to the measurement-related information and the configuration information, determine whether a measurement gap is required when operating with the target parameter and performing a target measurement, thereby obtaining indication information of whether a measurement gap is required corresponding to multiple target parameters.

The target measurement includes at least one of: intra-frequency measurement, inter-frequency measurement, inter-system measurement, switched beam measurement and layer-1 measurement.

Further, the UE 400 further includes:

a first receiving module used to receive measurement gap configuration information required when the UE operates with multiple target parameters transmitted by the network device; or, a second receiving module used to receive measurement gap configuration information required when the UE operates with an activated target parameter transmitted by the network device.

Further, the UE 400 further includes:

a second transmission module used to when determining that a measurement gap is not needed for the target parameter, transmit indication information of measurement gap not required to the network device.

Optionally, the second obtaining unit is used to, according to the measurement-related information and configuration information, determine indication information of whether a measurement gap is required when operating with an activated target parameter and performing target measurement.

The target measurement includes at least one of: intra-frequency measurement, inter-frequency measurement, inter-system measurement, switched beam measurement and layer-1 measurement.

Further, the UE 400 further includes:

a third receiving module used to receive measurement gap configuration information required when the UE operates with an activated target parameter transmitted by the network device.

Further, the UE 400 further includes:

a reporting module used to, when the network device switches the bandwidth part, re-determine the indication information of whether a measurement gap is required when operating with the activated target parameter, and report it to the network device.

Further, the UE 400 further includes:

a fourth receiving module used to receive measurement gap configuration information configured for the UE transmitted by the network device.

The obtaining module is used to, according to the measurement gap configuration information, obtain indication information of measurement gap not required when the UE operates with the target parameter.

The measurement gap configuration information includes measurement gap configuration information for all measurements or measurement gap configuration information for some measurements.

Optionally, when the target parameter includes at least one of a carrier, a carrier frequency band combination, a bandwidth part and a bandwidth part combination, the obtaining module obtains indication information of whether a measurement gap is required when the UE operates with a target parameter in a way including at least one of the following manners:

according to supported carrier frequency band, obtaining indication information of whether a measurement gap is required when operating at a target carrier and performing a target measurement;

according to supported carrier frequency band combination, obtaining indication information of whether a measurement gap is required when operating at a target carrier combination and performing a target measurement;

according to supported bandwidth part, obtaining indication information of whether a measurement gap is required when operating at a target bandwidth part and performing a target measurement of first measurement item configured for other bandwidth part;

according to supported bandwidth part, obtaining indication information of whether a measurement gap is required when operating at a target bandwidth part and performing a target measurement of second measurement item configured for other bandwidth part;

according to supported bandwidth part combination, obtaining indication information of whether a measurement gap is required when operating at a target bandwidth part combination and performing a target measurement of first measurement item configured for other bandwidth part combination;

according to supported bandwidth part combination, obtaining indication information of whether a measurement gap is required when operating at a target bandwidth part combination and performing a target measurement of second measurement item configured for other bandwidth part combination.

The target measurement includes at least one of: intra-frequency measurement, inter-frequency measurement, inter-system measurement, switched beam measurement and layer-1 measurement. The first measurement item includes: a carrier, a bandwidth part or a reference signal. The second measurement item includes at least one of a carrier, a carrier frequency band combination, a bandwidth part, a bandwidth part combination and a reference signal.

Further, the UE 400 further includes:

a fifth receiving module used to receive measurement gap configuration information fed back by the network device according to the indication information.

Optionally, the measurement gap configuration information includes at least one of a time start position, duration, a period, an aperiodic indication, a one-time indication, and an offset.

Optionally, when the indication information indicates that a measurement gap is required, the indication information includes: type information of the measurement gap that the UE expects to be configured by the network device.

The UE 400 provided in the embodiment of the present disclosure can implement the procedures implemented by the UE 400 in the method embodiment shown in FIG. 2, which will not be elaborated herein. The UE 400 in the embodiment of the present disclosure reports to the network device the indication information of whether a measurement gap is required when the UE operates with the target parameter. Then, the network device configures the measurement gap according to the indication information, thereby ensuring that the network device can configure the measurement gap according to the usage requirements of the UE, and then improving effectiveness of configuration of the measurement gap.

Figure 5:
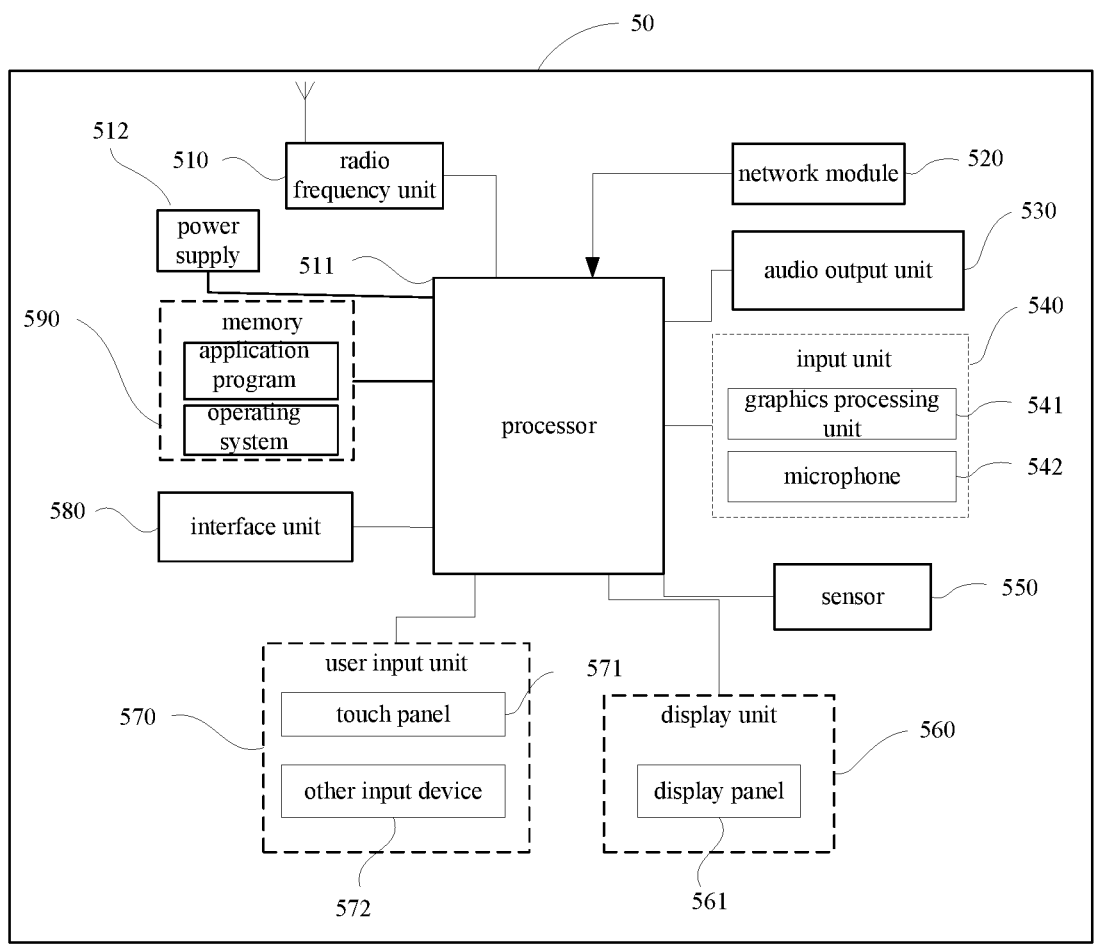
FIG. 5 is a schematic diagram of a user equipment according to an embodiment of the present disclosure.

FIG. 5 is a schematic diagram of a hardware structure of a user equipment (UE) according to an embodiment of the present disclosure.

The UE 50 includes, but is not limited to, a radio frequency unit 510, a network module 520, an audio output unit 530, an input unit 540, a sensor 550, a display unit 560, a user input unit 570, an interface unit 580, a memory 590, a processor 511, and a power supply 512 and other components. It will be understood by those skilled in the art that structures of the user equipment shown in FIG. 5 do not constitute a limitation on the user equipment, and the user equipment may include more or less components than the illustration, or combine some components, or different component arrangement. In the embodiment of the present disclosure, the user equipment includes, but is not limited to, a mobile phone, a tablet computer, a notebook computer, a palmtop computer, a vehicle-mounted terminal, a wearable device, a pedometer, and the like.

The processor 511 is used to obtain indication information of whether a measurement gap is required when the UE operates with a target parameter.

The radio frequency unit 510 is used to transmit the indication information to a network device.

The target parameter includes at least one of a carrier, a carrier frequency band combination, a bandwidth part, a bandwidth part combination and a reference signal.

The UE according to the embodiment of the present disclosure reports the indication information of whether the measurement gap is required when the UE operates with a target parameter to the network device, so that the network device configures the measurement gap according to the indication information, thereby ensuring that the network device can configure the measurement gap according to the usage requirements of the UE, and then improving effectiveness of configuration of the measurement gap.

It should be understood that, in the embodiment of the present disclosure, the radio frequency unit 510 can be used for receiving and transmitting information, or receiving and transmitting signals during a call. Specifically, the radio frequency unit receives downlink data from the network device and then provides the data to the processor 511 for processing; and transmits uplink data to the network device. In general, the radio frequency unit 510 includes, but is not limited to, an antenna, at least one amplifier, a transceiver, a coupler, a low noise amplifier, a duplexer, and the like. In addition, the radio frequency unit 510 may also communicate with the network and other devices through a wireless communication system.

The user equipment provides the user with wireless broadband internet access through the network module 520, such as helping users to transmit and receive emails, browse web pages, and access streaming media.

The audio output unit 530 can convert audio data received by the radio frequency unit 510 or the network module 520 or stored in the memory 590 into an audio signal and output as a sound. Further, the audio output unit 530 may also provide audio output related to a particular function (for example, call signal reception sound, message reception sound, etc.) performed by the user equipment 50. The audio output unit 530 includes a speaker, a buzzer, a receiver, and the like.

The input unit 540 is used for receiving an audio or video signal. The input unit 540 may include a graphics processing unit (GPU) 541 and a microphone 542. The graphics processing unit 541 processes image data of static pictures or videos obtained by an image capturing device (such as a camera) in a video capturing mode or an image capturing mode. The processed image frame can be displayed on the display unit 560. The image frames processed by the graphics processing unit 541 may be stored in the memory 590 (or other storage medium) or transmitted via the radio frequency unit 510 or the network module 520. The microphone 542 can receive sound and process such sound into audio data. The processed audio data can be converted into a format output that can be transmitted to the mobile communication network device via the radio frequency unit 510 in telephone call mode.

The user equipment 50 also includes at least one sensor 550, such as a light sensor, motion sensor and other sensors. Specifically, the light sensor includes an ambient light sensor and a proximity sensor. The ambient light sensor can adjust the brightness of a display panel 561 according to the brightness of the ambient light. The proximity sensor can turn off the display panel 561 and/or the backlight when the user equipment 50 is moved to the ear. As one type of the motion sensor, an accelerometer sensor can detect the magnitude of acceleration in various directions (usually three axes), and can detect the magnitude and direction of gravity when stationary, and can be used to identify orientation of the user equipment (such as horizontal and vertical screen switching, related games, magnetometer attitude calibration) and identify related functions via vibration (such as pedometer, tapping). The sensor 550 may further include a fingerprint sensor, a pressure sensor, an iris sensor, a molecular sensor, a gyroscope, a barometer, a hygrometer, a thermometer, an infrared sensor and the like, which are not described here.

The display unit 560 may be used to display information inputted by the user, or information provided for the user. The display unit 560 may include a display panel 561. Optionally, the display panel 561 may be configured by using LCD, or Organic Light-Emitting Diode (OLED).

The user input unit 570 may be used to receive numeric or character information inputted by a user, and generate an input of signal, which is relevant with user settings and function control of the user equipment. Specifically, the user input unit 570 may include a touch panel 571 and other input device 572. The touch panel 571, also referred to as touch screen, may collect touch operations of the user on or around the touch screen (e.g., a user's operations on the touch panel 571 by using a finger, a touch pen, or any appropriate object or attachment), and drive a corresponding connection device, based on a preset program. The touch panel 571 may include two parts, e.g., a touch detecting device, and a touch controller. The touch detecting device is used to detect a touch direction of a user, detect a signal from a touch operation, and transmit the signal to the touch controller. The touch controller is used to receive touch information from the touch detecting device, convert the touch information to contact coordinates, transmit the contact coordinates to the processor 511, receive and execute a command from the processor 511. In addition, the touch panel 571 may be implemented by various types, such as, resistive, capacitive, infrared, and surface acoustic waves. In addition to the touch panel 571, the user input unit 570 may also include other input device 572, which may include, but is not limited to, a physical keyboard, function keys (such as volume control buttons, switch buttons, etc.), trackball, mouse, joystick, and the like.

Further, the touch panel 571 may cover the display panel 561. When the touch panel 571 detects a touch operation on, or around it, transmits to the processor 511, so as to determine the type of the touch event. Subsequently, the processor 511 provides a corresponding visual output on the touch display based on the type of the touch event. Although in FIG. 5, the touch panel 571 and the display panel 561 are two independent components to implement the input and output functions of the user equipment, in a specific application, the touch panel 571 and the display panel 561 can be integrated to implement the input and output functions of the user equipment.

The interface unit 580 is an interface through which an external device is connected to the user equipment 50. For example, the external device may include a wired or wireless headset port, an external power (or battery charger) port, a wired or wireless data port, a memory card port, a port for connecting a device having an identification module, an audio input/output (I/O) port, video I/O port, headphone port. The interface unit 580 can be used to receive input from an external device (such as data information, power) and the received input may be transmitted to one or more components within the user equipment 50, or can be used to transmit data between the user equipment 50 and the external device.

The memory 590 can be used to store software programs as well as various data. The memory 590 may mainly include a storage program area and a storage data area. The storage program area may store an operating system, an application program required for at least one function (such as a sound playing function, an image playing function, etc.). The storage data area may store data created (such as audio data, phone book) when a mobile phone is used. Further, the memory 590 may include a high speed random access memory, and may also include a nonvolatile memory such as at least one magnetic disk storage device, flash memory device, or other volatile solid state storage device.

The processor 511 is a control center of the user equipment 50. The processor 511 connects each part of the whole user equipment, by using various interfaces and lines. The processor 511 performs various functions of the user equipment, and processes data, by running or executing software programs, and/or, modules in the memory 590, and calls data in the memory 590, so as to perform an overall monitor on the user equipment. Optionally, the processor 511 may include one or more processing units. Preferably, the processor 511 may integrate an application processor and a modem processor. The application processor mainly processes the operating system, the user interface, applications, etc. the modem processor mainly handles wireless communication. It can be understood that the above modem processor may not be integrated into the processor 511.

The user equipment 50 may further include a power source 512 (such as a battery) for supplying power to the various components. Preferably, the power source 512 may be logically connected to the processor 511 through a power management system to manage charging, discharging, and power management through the power management system.

In addition, the user equipment 50 includes some functional modules not shown, and details are not described herein again.

Optionally, one embodiment of the present disclosure further provides a user equipment, including a processor 511, a memory 590 and a computer program stored on the memory 590 and executable on the processor 511. The computer program is executed by the processor 511 to implement various procedures of the measurement gap indication method in the above embodiment and the same technical effects can be achieved. To avoid repetition, details are not described herein again.

One embodiment of the present disclosure further provides a computer readable storage medium. The computer readable storage medium stores a computer program. The computer program is executed by a processor to implement various procedures of the measurement gap indication method in the above embodiment and the same technical effects can be achieved. To avoid repetition, details are not described herein again. The computer readable storage medium may be, for example, a read-only memory (ROM), a random access memory (RAM), a magnetic disk, or an optical disk.

Figure 6:
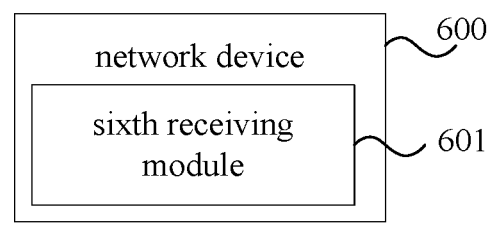
FIG. 6 is a schematic block diagram of a network device according to an embodiment of the present disclosure.

As shown in FIG. 6, one embodiment of the present disclosure further provides a network device 600, including:
a sixth receiving module 601 used to receive indication information of whether a measurement gap is required transmitted by a user equipment (UE).

The indication information is determined when the UE operates with a target parameter. The target parameter includes at least one of a carrier, a carrier frequency band combination, a bandwidth part, a bandwidth part combination and a reference signal.

Optionally, when the target parameter includes a carrier, the carrier includes: a center frequency and a bandwidth.

When the target parameter includes a bandwidth part, the bandwidth part includes at least one of identification information of the bandwidth part, a center frequency, an offset value according to a preset reference frequency, an occupied bandwidth and a subcarrier spacing.

Further, the sixth receiving module 601 includes:
a transmission unit used to transmit measurement-related information and configuration information of the target parameter to the UE;
a receiving unit used to receive indication information of whether a measurement gap is required when the UE operates with the target parameter, which is determined by the UE according to the measurement-related information and the configuration information and transmitted by the UE.

Optionally, the measurement-related information includes: measuring object (MO), reference signal configuration corresponding to the measuring object and configuration of measurement time window.

The measuring object is a measuring object of at least one of intra-frequency measurement, inter-frequency measurement, inter-system measurement, switched beam measurement and layer-1 measurement.

Optionally, the configuration information includes: at least one of time-frequency position, period, duration, offset, bandwidth, and Numerology of an item to be measured transmitted at UE servicing frequency and other frequency.

The item to be measured includes at least one of Synchronous Signal Block (SSB) and CSI-RS.

Further, when the indication information is indication information of whether a measurement gap is required corresponding to multiple target parameters, the network device 600 further includes:
a third transmission module used to transmit measurement gap configuration information required when the UE operates with multiple target parameters to the UE; or,
a fourth transmission module used to transmit measurement gap configuration information required when the UE operates with an activated target parameter to the UE.

Further, the network device 600 further includes:
a fifth transmission module used to transmit measurement gap configuration information configured for the UE to the UE, where the measurement gap configuration information includes measurement gap configuration information for all measurements or measurement gap configuration information for some measurements.

The sixth receiving module is used to receive indication information of measurement gap not required transmitted by the UE.

Further, the network device 600 further includes:
a feedback module used to feed back the measurement gap configuration information to the UE according to the indication information.

Optionally, the measurement gap configuration information includes at least one of a time start position, duration, a period, an aperiodic indication, a one-time indication and an offset.

Optionally, when the indication information indicates that the measurement gap is required, the indication information may include: type information of the measurement gap that the UE expects to be configured by the network device.

It should be noted that this network device embodiment is a network device corresponding to the above-mentioned measurement gap receiving method applied to the network device. All implementation methods of the above embodiments are applicable to this network device embodiment and the same technical effects can also be achieved.

One embodiment of the present disclosure further provides a network device, including: a memory, a processor, and a computer program stored on the memory and executable on the processor. The computer program is executed by the processor to implement various procedures of the measurement gap receiving method in the above embodiment and the same technical effects can be achieved. To avoid repetition, details are not described herein again.

One embodiment of the present disclosure further provides a computer-readable storage medium. The computer readable storage medium stores a computer program. The computer program is executed by a processor to implement various procedures of the measurement gap receiving method in the above embodiment and the same technical effects can be achieved. To avoid repetition, details are not described herein again. The computer readable storage medium may be, for example, a read-only memory (ROM), a random access memory (RAM), a magnetic disk, or an optical disk.

Figure 7:
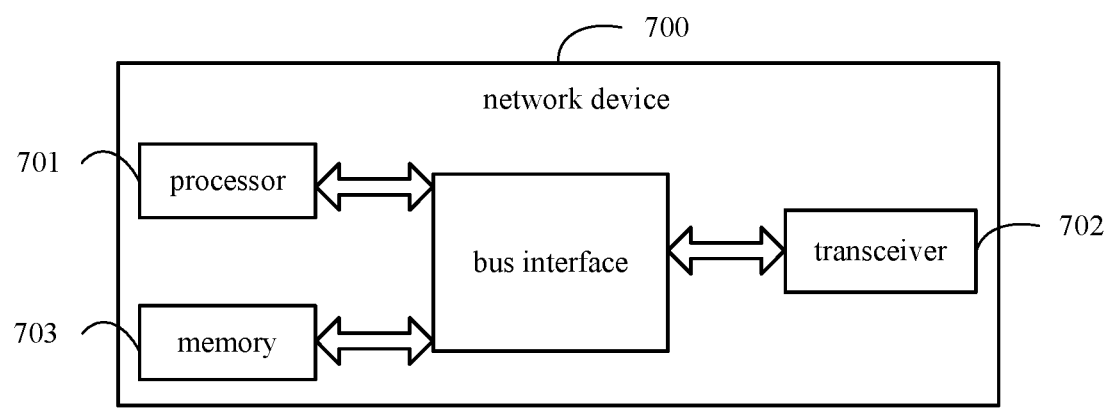
FIG. 7 is a schematic diagram of a network device according to an embodiment of the present disclosure.

FIG. 7 is a structural diagram of a network device according to an embodiment of the present disclosure, which can implement the details of the measurement gap receiving method applied to the network device and achieve the same effect. As shown in FIG. 7, the network device 700 includes a processor 701, a transceiver 702, a memory 703 and a bus interface.

The processor 701 is used to read a program in the memory 703 and execute the following process: receiving indication information of whether a measurement gap is required transmitted by a user equipment (UE) through the transceiver 702.

The indication information is determined when the UE operates with a target parameter. The target parameter includes at least one of a carrier, a carrier frequency band combination, a bandwidth part, a bandwidth part combination and a reference signal.

Optionally, when the target parameter includes a carrier, the carrier includes: a center frequency and a bandwidth.

When the target parameter includes a bandwidth part, the bandwidth part includes at least one of identification information of the bandwidth part, a center frequency, an offset value according to a preset reference frequency, an occupied bandwidth and a subcarrier spacing.

In FIG. 7, the bus architecture may include any number of interconnected buses and bridges. Specifically, one or more processors demonstrated with processor 701 are coupled with various circuits of memory, which is demonstrated with memory 703. The bus architecture may also link various other circuits, such as, peripherals, voltage regulators, and power management circuits, as is known in the art. Thus, in the application, no further description is provided. The bus interface provides an interface. The transceiver 702 may be composed of multiple components, that is, including a transmitter and a receiver, which provide a unit for communicating with various other devices via the transmitting medium.

The processor 701 is in charge of managing bus architecture and general processing. The memory 703 may store data used when the processor 701 performs operations.

Optionally, the program in the memory 703 is executed by the processor 701 to implement the following steps:

transmitting measurement-related information and configuration information of the target parameter to the UE through the transceiver 702;

receiving indication information of whether a measurement gap is required when the UE operates with the target parameter, which is determined by the UE according to the measurement-related information and the configuration information and transmitted by the UE, through the transceiver 702.

Optionally, the program in the memory 703 is executed by the processor 701 to implement the following steps: receiving a status parameter reported by the UE through the transceiver 702.

Optionally, the measurement-related information includes: measuring object (MO), reference signal configuration corresponding to the measuring object and configuration of measurement time window.

The measuring object is a measuring object of at least one of intra-frequency measurement, inter-frequency measurement, inter-system measurement, switched beam measurement and layer-1 measurement.

Optionally, the configuration information includes: at least one of time-frequency position, period, duration, offset, bandwidth, and Numerology of an item to be measured transmitted at UE servicing frequency and other frequency.

The item to be measured includes at least one of Synchronous Signal Block (SSB) and CSI-RS.

Optionally, when the indication information is indication information of whether a measurement gap is required corresponding to multiple target parameters, the program in the memory 703 is executed by the processor 701 to implement the following steps:

transmitting measurement gap configuration information required when the UE operates with multiple target parameters to the UE through the transceiver 702; or, transmitting measurement gap configuration information required when the UE operates with an activated target parameter to the UE through the transceiver 702.

Optionally, the program in the memory 703 is executed by the processor 701 to implement the following steps:

transmitting measurement gap configuration information configured for the UE to the UE through the transceiver 702, where the measurement gap configuration information includes measurement gap configuration information for all measurements or measurement gap configuration information for some measurements;

receiving indication information of measurement gap not required transmitted by the UE through the transceiver 702.

Optionally, the program in the memory 703 is executed by the processor 701 to implement the following steps: feeding back the measurement gap configuration information to the UE according to the indication information.

Optionally, the measurement gap configuration information includes at least one of a time start position, duration, a period, an aperiodic indication, a one-time indication and an offset.

Optionally, when the indication information indicates that the measurement gap is required, the indication information may include: type information of the measurement gap that the UE expects to be configured by the network device.

The network device according to the embodiment of the present disclosure configures the measurement gap according to the indication information of whether the measurement gap is required, thereby improving effectiveness of configuration of the measurement gap.

The network device may be Base Transceiver Station (BTS) in Global System of Mobile communication (GSM) or Code Division Multiple Access (CDMA), NodeB (NB) in Wideband Code Division Multiple Access (WCDMA), Evolutional Node B (eNB or eNodeB) in LTE, a relay station, an access point, or a base station in future 5G network, which are not limited here.

It should be noted that, the terms "comprise", "include" or any other variations are intended to encompass a non-exclusive inclusion, such that a process, method, system, article or device that include a series of steps or elements include not only those steps or elements but also other steps or elements that are not explicitly listed, or steps or elements that are inherent to such process, method, article or device. Without more restrictions, an element defined by the sentence "including a . . . " does not exclude that there are other identical elements in the process, method, article or device that includes the element.

Through the description of the above embodiments, those skilled in the art can clearly understand that the methods in the above embodiments may be implemented by means of software plus a necessary universal hardware platform, and of course, may be implemented by hardware, but in many cases the former is better implementation. Based on such understanding, the technical solution of the present disclosure that is essentially or contributes to the existing technology may be embodied in the form of a software product, which is stored in a storage medium (such as ROM/RAM, magnetic disk, optical disc) including several instructions for causing a terminal device (which may be a mobile phone, a computer, a server, an air conditioner, or a network device) to execute the methods described in the embodiments of the present disclosure.

Foregoing describes optional implementation modes of the present disclosure, but the protection scope of the present disclosure is not limited to this. For persons having ordinary skill in the art, several improvements and changes may be made, without departing from the principle of the present disclosure. These improvements and changes should also be within the scope of the present disclosure. Therefore, the protection scope of the present disclosure shall be subject to the protection scope of the claims.

What is claimed is:

1. A measurement gap indication method comprising:
   obtaining, by a user equipment (UE) measurement-related information and configuration information of a target parameter configured by a network device for the UE;
   according to measurement time window in the measurement-related information and the configuration information, obtaining, by the UE, indication information of whether a measurement gap is required when the UE operates with the target parameter;
   transmitting, by the UE, the indication information to the network device;
   wherein the target parameter comprises at least one of carrier, carrier frequency band combination, bandwidth part, bandwidth part combination and reference signal.

2. The method according to claim 1, wherein when the target parameter comprises the carrier, the carrier comprises: center frequency and bandwidth;
   when the target parameter comprises the bandwidth part, the bandwidth part comprises at least one of identification information of the bandwidth part, center frequency, offset value according to preset reference frequency, occupied bandwidth and subcarrier spacing.

3. The method according to claim 1, wherein the step of according to the measurement time window in the measurement-related information and the configuration information, obtaining the indication information of whether the measurement gap is required when the UE operates with the target parameter, comprises:
   according to the measurement time window in the measurement-related information and the configuration information, determining whether a measurement gap is required when operating with the target parameter and performing a target measurement, thereby obtaining indication information of whether a measurement gap is required corresponding to a plurality of target parameters;
   the target measurement comprises at least one of: intra-frequency measurement, inter-frequency measurement, inter-system measurement, switched beam measurement and layer-1 measurement.

4. The method according to claim 3, wherein after the step of transmitting the indication information to a network device, the method further comprises:
   receiving measurement gap configuration information required when the UE operates with the plurality of target parameters transmitted by the network device; or,
   receiving measurement gap configuration information required when the UE operates with an activated target parameter transmitted by the network device.

5. The method according to claim 3, wherein the method further comprises:
   when determining that the measurement gap is not needed for the target parameter, transmitting indication information of measurement gap not required to the network device.

6. The method according to claim 1, wherein the step of according to the measurement time window in the measurement-related information and the configuration information, obtaining the indication information of whether the measurement gap is required when the UE operates with the target parameter, comprises:
   according to the measurement time window in the measurement-related information and configuration information, determining indication information of whether a measurement gap is required when operating with an activated target parameter and performing target measurement;
   wherein the target measurement comprises at least one of: intra-frequency measurement, inter-frequency measurement, inter-system measurement, switched beam measurement and layer-1 measurement.

7. The method according to claim 6, wherein after the step of transmitting the indication information to a network device, the method further comprises:
   receiving measurement gap configuration information required when the UE operates with the activated target parameter transmitted by the network device.

8. The method according to claim 1, wherein before the step of obtaining, by the UE, indication information of whether a measurement gap is required when the UE operates with the target parameter, the method further comprises:
   receiving measurement gap configuration information configured for the UE transmitted by the network device;
   wherein the step of obtaining, by the UE, indication information of whether a measurement gap is required when the UE operates with the target parameter, comprises:
   according to the measurement time window in the measurement-related information, the configuration information and the measurement gap configuration information, obtaining indication information of measurement gap not required when the UE operates with the target parameter;
   wherein the measurement gap configuration information comprises measurement gap configuration information for all measurements or measurement gap configuration information for some measurements.

9. The method according to claim 1, wherein when the target parameter comprises at least one of carrier, carrier frequency band combination, bandwidth part and bandwidth part combination; the step of obtaining indication information of whether a measurement gap is required when the UE operates with the target parameter, comprises:
   according to the measurement time window in the measurement-related information, the configuration information and supported carrier frequency band, obtaining indication information of whether a measurement gap is required when operating at a target carrier and performing a target measurement;

according to the measurement time window in the measurement-related information, the configuration information and supported carrier frequency band combination, obtaining indication information of whether a measurement gap is required when operating at a target carrier combination and performing a target measurement;

according to the measurement time window in the measurement-related information, the configuration information and supported bandwidth part, obtaining indication information of whether a measurement gap is required when operating at a target bandwidth part and performing a target measurement of first measurement item configured for other bandwidth part;

according to the measurement time window in the measurement-related information, the configuration information and supported bandwidth part, obtaining indication information of whether a measurement gap is required when operating at a target bandwidth part and performing a target measurement of second measurement item configured for other bandwidth part;

according to the measurement time window in the measurement-related information, the configuration information and supported bandwidth part combination, obtaining indication information of whether a measurement gap is required when operating at a target bandwidth part combination and performing a target measurement of first measurement item configured for other bandwidth part combination;

according to the measurement time window in the measurement-related information, the configuration information and supported bandwidth part combination, obtaining indication information of whether a measurement gap is required when operating at a target bandwidth part combination and performing a target measurement of second measurement item configured for other bandwidth part combination;

wherein the target measurement comprises at least one of: intra-frequency measurement, inter-frequency measurement, inter-system measurement, switched beam measurement and layer-1 measurement; the first measurement item comprises: carrier, bandwidth part or reference signal; the second measurement item comprises at least one of carrier, carrier frequency band combination, bandwidth part, bandwidth part combination and reference signal.

10. The method according to claim 9, wherein after the step of transmitting the indication information to a network device, the method further comprises:
receiving measurement gap configuration information, wherein the measurement gap configuration information is fed back by the network device according to the indication information.

11. The method according to claim 1, wherein when the indication information indicates that the measurement gap is required, the indication information comprises: type information of the measurement gap that the UE expects to be configured by the network device.

12. A measurement gap receiving method comprising:
transmitting, by a network device, configuration information of a target parameter and measurement-related information including measurement time window to a user equipment (UE);

receiving, by the network device, indication information of whether a measurement gap is required when the UE operates with the target parameter;

wherein the target parameter comprises at least one of carrier, carrier frequency band combination, bandwidth part, bandwidth part combination and reference signal.

13. The method according to claim 12, wherein when the indication information is indication information of whether a measurement gap is required corresponding to a plurality of target parameters, the method further comprises:
transmitting measurement gap configuration information required when the UE operates with the plurality of target parameters to the UE; or,
transmitting measurement gap configuration information required when the UE operates with an activated target parameter to the UE.

14. The method according to claim 12, wherein before the step of receiving, by the network device, indication information of whether a measurement gap is required, the method further comprises:
transmitting measurement gap configuration information configured for the UE to the UE; wherein the measurement gap configuration information comprises measurement gap configuration information for all measurements or measurement gap configuration information for some measurements;
wherein the step of receiving, by the network device, indication information of whether a measurement gap is required, comprises:
receiving indication information of measurement gap not required transmitted by the UE.

15. The method according to claim 12, wherein after the step of receiving, by the network device, indication information of whether a measurement gap is required, the method further comprises:
feeding back the measurement gap configuration information to the UE according to the indication information.

16. A user equipment (UE) comprising: a memory, a processor, and a program stored on the memory and executable on the processor; wherein the program is executed by the processor to implement steps of a measurement gap indication method that includes:
obtaining measurement-related information and configuration information of a target parameter configured by a network device for the UE;
according to measurement time window in the measurement-related information and the configuration information, obtaining indication information of whether a measurement gap is required when the UE operates with the target parameter;
transmitting the indication information to the network device;
wherein the target parameter comprises at least one of carrier, carrier frequency band combination, bandwidth part, bandwidth part combination and reference signal.

17. The UE according to claim 16, wherein when the target parameter comprises the carrier, the carrier comprises: center frequency and bandwidth;
when the target parameter comprises the bandwidth part, the bandwidth part comprises at least one of identification information of the bandwidth part, center frequency, offset value according to preset reference frequency, occupied bandwidth and subcarrier spacing.

18. The UE according to claim 16, wherein when obtaining the indication information of whether the measurement gap is required when the UE operates with the target parameter, according to the measurement time window in the measurement-related information and the configuration information, the program is executed by the processor to implement steps of:

according to the measurement time window in the measurement-related information and the configuration information, determining whether a measurement gap is required when operating with the target parameter and performing a target measurement, thereby obtaining indication information of whether a measurement gap is required corresponding to a plurality of target parameters;

the target measurement comprises at least one of: intra-frequency measurement, inter-frequency measurement, inter-system measurement, switched beam measurement and layer-1 measurement.

19. The UE according to claim 18, wherein after transmitting the indication information to a network device, the program is executed by the processor to implement steps of:

receiving measurement gap configuration information required when the UE operates with the plurality of target parameters transmitted by the network device; or, receiving measurement gap configuration information required when the UE operates with an activated target parameter transmitted by the network device.

20. The UE according to claim 18, wherein the program is executed by the processor to implement steps of:

when determining that the measurement gap is not needed for the target parameter, transmitting indication information of measurement gap not required to the network device.

\* \* \* \* \*